United States Patent Office 3,546,332
Patented Dec. 8, 1970

3,546,332
SURFACE CRYSTALLIZATION OF POLY(2,2,4,4-TETRAMETHYLCYCLOBUTANEDIOL - 1,3) CARBONATES
Charles N. Merriam, Martinsville, Robert H. Snedeker, Piscataway, and Herbert G. Stine, Millington, N.J., assignors to Union Carbide Corporation, a corporation of New York
No Drawing. Filed Dec. 26, 1967, Ser. No. 693,102
Int. Cl. B29c 25/00
U.S. Cl. 264—343                    7 Claims

ABSTRACT OF THE DISCLOSURE

Method of preparing a shaped transparent, nonoriented carbonate polymer containing the esterification residue of 2,2,4,4-tetramethylcyclobutanediol-1,3 having a crystalline surface and an amorphous interior and which is resistant to attack by solvating organic liquids, such as conventional solvents for the polymer and fatty acids and the like usually found in body oils, without adversely affecting their transparency which method involves immersing the amorphous shaped polymer in a liquid aqueous solution of acetone, the solution being maintained at such a concentration and the immersion period being for such a time sufficient to crystallize the surfaces of the polymer in contact therewith without adversely affecting the transparency of the polymer, and thereafter annealing the polymer by heating to a temperature below its glass transition temperature for a period of time sufficient to remove stresses.

---

This invention relates to the crystallization of amorphous carbonate polymers. More particularly, it is directed to the crystallization of amorphous aliphatic carbonate polymers, particularly those containing the esterification residue of 2,2,4,4-tetramethylcyclobutanediol-1,3 to enhance their resistance to solvating organic liquids such as conventional solvents for the polymer and fatty acids and the like usually found in body oils, without adversely affecting their transparency.

While the most widely known and used carbonate polymers have been the aryl carbonate polymers such as those based on "bisphenol A," 2,2-bis(4-hydroxyphenyl) propane, and other polyhydric phenols, recently discovered carbonate polymers containing the esterification residue of 2,2,4,4-tetramethylcyclobutanediol-1,3 (characterized as 2,2,4,4-tetramethylcyclobutylene), hereinafter designated TMCBD, have been found to possess properties superior to those of the aryl carbonate polymers and indeed, even to other aliphatic carbonate polymers which do not contain TMCBD. For example, the clarity and weathering resistance of these new polymers surpass the commercial aryl carbonates presently available. However, while the amorphous TMCBD containing polycarbonates possess many enhanced properties, they also exhibit a serious deficiency in that they become indelibly marked or marred after contact with solvating organic liquids, such as solvents and solvating body oils. Thus on handling shaped articles of manufacture made of these polymers with one's hands, the surface can be indelibly marred by creating blotches, which achieve an unattractive gross haziness on the surface. Moreover, the surfaces of such polymers are typically soluble in liquids which are commonly used, such as acetone, benzene, chlorobenzene, toluene, xylene, carbon tetrachloride, chloroform, trichloroethylene, perchloroethylene and tetrachloroethane, and articles therefrom are susceptible to marring when contacted by such solvents. This lack of surface resistance of polymers containing TMCBD to solvation seriously impairs their commercial usefulness. The indelible marring of these polycarbonates by body oils appears to be exclusive and is not seen to be a problem with aryl polycarbonates.

There is described herein a process of preparing a polycarbonate containing TMCBD which is not marred or blotched by body oils, particularly human body oils, and conventional solvents which dissolve the amorphous polycarbonate. Moreover, the polycarbonate prepared as described herein possesses enhanced surface clarity and transparency, determined when free of incompatible components such as pigments, dyes and/or fillers, than the corresponding amorphous polycarbonate.

This invention is concerned with a method of preparing a crystalline, nonoriented polycarbonate containing TMCBD as a unit thereof, most preferably a homopolymer of sequentially repeating units of

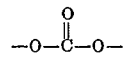

and TMCBD. More particularly, this invention is concerned with the preparation of such a crystalline, nonoriented polycarbonate which possesses a surface thereof which is resistant to solvation by body oils and conventional solvents for the corresponding amorphous polycarbonate.

This invention encompasses the treatment of already formed amorphous polymers to induce crystallinity therein whereby to produce a shaped article of the crystalline polymer which possesses resistance to marring when contacted at a crystalline containing portion thereof with solvating liquids such as conventional solvents and body oils.

A specific embodiment of this invention is a method of preparing a shaped, transparent, nonoriented carbonate polymer containing the esterification residue of 2,2,4,4-tetramethylcyclobutanediol-1,3 having a crystalline surface and an amorphous interior and which is resistant to attack by solvating organic liquids, such as conventional solvents for the polymers and fatty acids and the like usually found in body oils, without adversely affecting their transparency, which method comprises dissolving at least a portion of the surface of the shaped polymer with liquid acetone, such as by immersing the amorphous shaped polymer in liquid acetone, e.g., an aqueous solution of acetone containing from about 25 percent to about 95 percent by volume of acetone based on the volume of the combined mixture, for a period of time in which such portion is dissolved, for example, for a period of at least 2 seconds and thereafter annealing the polymer by heating to a temperature below its glass transition temperature for a period of time sufficient to remove stresses.

It is not intended herein to imply that when any portion of the polymer is made crystalline that that portion is wholly crystalline to the exclusion of an amorphous phase. The term crystallinity or crystalline means herein and in the claims that that portion of the polymer which is so regarded to be crystalline contains both a crystalline and amorphous phase and the amount of crystallinity present is detectable and renders that portion of the polymer resistant to solvation by solvents which will normally solvate an amorphous portion of the same polymer free of such crystallinity. The presence of crystallinity can be determined by conventional methods such as X-ray defraction and solubility.

The polycarbonate polymers utilized in the process of this invention include homopolymers and copolymers and consist of alternating carbonate groups

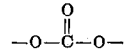

and the divalent moiety of 2,2,4,4-tetramethylcyclobutylene formed by theoretically splitting off both hydroxyl groups of 2,2,4,4-tetramethylcyclobutanediol-1,3 to yield the divalent radical

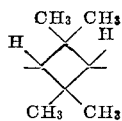

These polycarbonates can be advantageously prepared by the general method of alcoholysis and ester interchange as is more fully described in British Pat. 1,011,283 and/ or U.S. Pat. 3,313,777.

The polycarbonate homopolymers are preferred since they have been found to be of greatest utility and most suitable to the process employed herein. More particularly, these homopolymers are those which are of sufficiently high molecular weight to be normally solid, i.e., solid at normal room temperatures, but are also of sufficiently low molecular weight to be tractable and thermoformable. In general, in the homopolymer represented by the structure

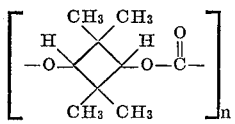

the number $n$ has a value such that the reduced viscosity (determined with 0.2 gram polymer dissolved in 100 ml. of chloroform at 25° C.) of the polymer is from about 0.25 to about 10.0, but preferably from about 0.4 to 2.7, with reduced viscosities in the range of about 0.50 to about 1.50 being particularly preferred.

The modified polymers which are designated hereinafter as TMCBD polycarbonate copolymers are characterized by containing as recurring units within the polymer chain, esterification residue moieties of one or more diols other than and in addition to 2,2,4,4-tetramethylcyclobutylene moieties. The modifying diols can be either dihydric phenols, bisphenols, aliphatic diols, or mixed diols in which one of the two active hydroxyl groups is directly attached to an aromatic ring and the other reactive hydroxyl group is attached to an aliphatic carbon atom.

The diphenol reactants suitably employed include any of the diphenols heretofore employed in the formation of prior known polycarbonate resins. Conveniently they can be classified as conforming to the general formula (I) 

in which Ar in each occurrence represents a divalent aromatic radical, preferably phenylene, but also can be polynuclear, such as bisphenylene, a fused ring structure having an aromatic character such as naphthylene, anthrylene and the like or mixed polynuclear aromatic radicals. The divalent radical (Ar—R$_n$—Ar) is hereinafter identified as a divalent aromatic carbocyclic group derived from a dihydric phenol. R in each occurrence can be an alkylene or alkylidene radical such as methylene, ethylene, propylene, propylidene, isopropylidene, butylene, butylidene, isobutylidene, amylene, isoamylene, amylidene, isoamylidene, and the like; a cycloaliphatic radical such as cyclopentylidene, cyclohexylidene, cyclopentylene and cyclohexylene; a divalent radical formed from two or more alkylene or alkylidene groups connected by a nonalkylene or nonalkylidene group such as an aromatic linkage, a cycloaliphatic linkage, a tertiary amino linkage, an ether linkage, a thioether linkage, a carbonyl linkage, a sulfur-containing linkage such as sulfoxide or sulfone; an ether linkage, a carbonyl group, or a silicon-containing group; $n$ can be either zero or one.

Both Ar and R in the above general formula can contain substituent groups inert toward the reactants under the conditions of the reaction system. Such substituents include monovalent hydrocarbon groups such as methyl, ethyl, propyl, phenyl, naphthyl, benzyl, ethylphenyl, cyclopentyl, cyclohexyl, and the oxy derivatives thereof; inorganic radicals such as chlorine, bromine, fluorine, and the like.

The aliphatic diols include cycloaliphatic, straight and branched chain diols free of substituent groups reactive toward the other reactants of the reaction system. In general, these diols conform to the formula:

(II)        HO—Y—OH in which Y can be an alkylene group such as ethylene, propylene, butylene, amylene, isoamylene, neopentylene and the like; two or more alkylene or alkylidene groups connected by a nonalkylene or nonalkylidene group such as an ether linkage, an arylene linkage, a carbonyl linkage, a sulfur containing linkage such as sulfide, sulfoxide or sulfon, a cycloaliphatic group such as cyclopentylene, cyclohexylene, or a silicon-containing linkage such as dimethylsilyl or dimethylsiloxy. Substituent groups on the Y group can be halogen, nitro, cyano or aryl, but reactive groups such as hydroxyl (other than the two such groups necessarily present), amine, and carboxyl are to be avoided unless one wishes to effect cross-linking of the polymer.

Specifically illustrative of the cycloaliphatic diols that can be employed in this invention, but in no way limitative thereof, are 2,5- or 2,6-norbornane diol, 2,5- or 2,6-norbornane dimethanol, mixed cyclohexane-1,4 - diols, cyclohexane-1,4-dimethanols and the like.

The preparation of the polycarbonate copolymers is accomplished by the method described hereinbefore for preparing polycarbonate homopolymers from 2,2,4,4-tetramethylcyclobutanediol-1,3. Reaction conditions with respect to temperature, pressure, catalysts, chain growth terminators, solvents, carbonate precursors, concentration of reactants and the like, apply with equal force to the preparation of the copolymers. Preferably, either one or a mixture of dihydroxy compounds other than 2,2,4,4-tetramethylcyclobutanediol-1,3 can be suitably employed provided that the 2,2,4,4-tetramethylcyclobutanediol-1,3 is present in a mole percent of at least about 60 and preferably not less than 80 based on the total moles of dihydroxy compounds in the formulation of reactants.

The most preferred copolymers are in general represented by the structure:

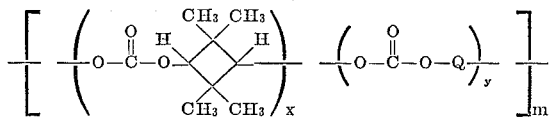

wherein Q in each occurrence represents an (Ar—R$_n$—Ar) group or a (Y) group of Formulae I and II above, respectively, $m$ has a value such that the reduced viscosity of the copolymer (determined with 0.2 gram polymer dissolved in 100 ml. chloroform at 25° C.) is from about 0.25 to about 10.0, preferably from about 0.4 to 2.7, and the relationship of $x$ and $y$ is the expression $x/(x+y)$ which has a value of at least about 0.6 and preferably at least about 0.8. It is particularly preferred that the polymer have a reduced viscosity value of from about 0.50 to 1.50.

As produced these polycarbonate polymers prepared from 2,2,4,4-tetramethylcyclobutanediol-1,3 are amorphous polymers, which as stated earlier, are readily attacked by body oils while the crystallized polymers are not. Though crystallinity can achieve such an advantage, improper processing which can create non-orientation induced crystallinity can result in loss of transparency or clarity of the polymer. For example, when the amorphous polymer is immersed in 100 percent liquid acetone at temperatures of from about 15° C. to about 40° C., crystallization of the surface of the polymer occurs but in addition thereto, the polymer whitens. This whitening is undesirable. But since crystallinity and clarity of the polymer in the present invention are a function of liquid acetone temperature as well as liquid acetone concentration and immersion time, this whitening can be alleviated and even eliminated by reducing the solvating power of the acetone, as for example by cooling the acetone. Obviously, working at low or cooling temperatures are inconvenient and impractical for commercial application since such temperatures are not easily obtainable. On the other hand, liquid acetone temperatures of from about 15° C. to about 40° C. are readily and conveniently obtainable and hence most particularly preferred. Hence, it was found, in accordance with the present invention, that liquid acetone somewhat diluted in an aqueous solution and maintained at temperatures of from about 15° C. to about 40° C. is a unique method for crystallizing the surface of TMCBD carbonate polymers without impairing the clarity of the polymer. In fact, the clarity is typically enhanced by such treatment.

In the technique of crystallizing the surfaces of the amorphous polymer in the present invention, it is preferred to use aqueous solutions containing from about 50 percent to about 90 percent by volume liquid acetone based on the volume of the total mixture, although it is particularly preferred to use an aqueous solution containing from about 75 percent to about 85 percent liquid acetone by volume based on the volume of the total mixture. This concentration has been found to produce a balance of minimum adverse optical effects and maximum protection from indelible marking, and also, one can practice the invention at conveniently obtained temperatures and for minimum immersion times. If the aqueous solution of liquid acetone is maintained at temperatures of from about 15° C. to about 40° C. concentrations of about 95 percent or more can cause the polymer to whiten while concentrations below about 50 percent achieve limited crystallization and print resistance, i.e., the polymer's resistance to indelible marking within practicable processing time.

It should be noted that when acetone and water are mixed, a certain amount of molecular packing results. This accordingly effects a certain loss in volume. For example when 80 milliliters of liquid acetone is placed in a 100 milliliter graduated cylinder, 23 milliliters of water are required to bring the level to 100 milliliters, 3 milliliters volume being lost on mixing. The volume percentage used herein are established on the parts by volume acetone relative to the total volume of the mixture. All solutions defined herein are prepared by taking from about 50 parts to about 90 parts by volume liquid acetone and adding a sufficient amount of water to raise the total number of parts by volume to 100.

Upon selecting a suitable liquid acetone concentration, the polymer is immersed in the liquid acetone solution for a time sufficient to crystallize the surface and make it resistant to subsequent attack by body oils and organic solvents. The immersion time of the polymer in the liquid acetone solution is inversely proportional to the concentration of liquid acetone employed. Accordingly, while the amorphous carbonate polymer can be held immersed from about 2 seconds to about 60 seconds or longer, to produce the desired effect, it is especially preferred to hold it submerged for a period of from about 3 to about 5 seconds. While immersion times longer than 60 seconds can be used especially with lower concentration such treatment times are impractical since they are not necessary. While warm or cold acetone-water solutions (such as temperatures as high as 100° C. in a closed vessel or as low as 0° C.) can be used it has been found that no advantage accrues over operating this treatment at about room temperature (about 15° C. to about 40° C.)

When the TMCBD carbonate polymer is tested after treatment with aqueous acetone, the polymer is "print resistant." However, the polymer has a tendency to craze or crack under prolonged exposure to body oils. Annealing the specimen after the treatment with aqueous acetone for a period of time sufficient to remove stresses overcomes this tendency of the polymer. Annealing is a heat treatment of the polymer and can be readily effected by several methods. For example, instantaneous exposure of the polymer to a flame will effectively anneal the polymer. Similarly, heating in an oven where the polymer therein is at a temperature below the glass transition temperature of the polymer, e.g., below about 130° C. for periods of from about one to about five minutes in the case of the homopolymer, is usually sufficient to effectively anneal the polymer. For practical purposes, it is preferred to anneal the polymer by heating it to a temperature in the range of from about 95° C. to about 130° C. since below that range considerable time is required to effectively anneal the polymer, while above that range the polymer has a tendency to distort or warp. This is not an absolute range because it can vary somewhat in the case of some copolymers; however, it is a generally applicable range for all the polymers described herein. A preferred method of annealing the polymer is accomplished by submerging it in boiling water for a period of from about one and one-half to about three minutes. This last method provides an effective method of annealing the polymer continuously and is preferred for both its effectiveness and simplicity. Other annealing media than water can be used provided they are inert to the polymer, for example, ethylene glycol. The minimum annealing time for this last medium has been found generally to be about 30 seconds at about 130° C.

It should be noted that annealing conditions are dependent on several factors, namely (a) the aqueous acetone immersion conditions, (b) the nature of the annealing environment, that is, liquid, solid or gas, and (c) the temperature of the same. More specifically, the longer the acetone immersion time, or the more concentrated the mixture, the longer the annealing period, since the crystallized skin is thicker, thus producing a greater strain level to be alleviated. Also, a liquid medium is more efficient than air, which in turn is better than the solid (for example, planishing plates or rolls). Furthermore, annealing times vary inversely with temperature.

While surface crystallization of the amorphous TMCBD carbonate polymers increases their resistance to subsequent attack by natural body oils and the aforementioned organic solvents, it similarly increases the resistance of the surface to the effects of other attacking material such as lemon oil, kerosene, mineral spirits, gasoline and alcohols, while at the same time decreases haze level and improves gloss.

The process of this invention is applicable to carbonate polymers in any form, e.g., sheet, film, rod, filament, and various molded forms and shapes. Crystallization and annealing of TMCBD polycarbonate sheet under the preferred conditions set forth above provide a transparent, nonoriented, amorphous polycarbonate having a clear crystalline skin. This polymer can be so improved by the process of this invention that it can be made to neither crack nor indelibly print after contact with body oils for ten days.

In addition to the enhanced properties set forth above, it should be noted that neither the crystalline surface nor the amorphous core of the polymer is oriented. Accordingly, shrinkage or distortion on heating does not occur.

Quite surprisingly this process is not applicable to the carbonate polymers based principally on dihydric phenols as usually no effect is obtained. In fact, the present invention applied to certain of the aryl carbonate polymers has actually had an adverse effect on the properties of the polymer.

The example which follows serves to illustrate this invention.

Fifteen samples of 100-mil slot extruded sheets of the amorphous homopolymer of 2,2,4,4-tetramethylcyclobutylene-1,3-carbonate having a reduced viscosity of 0.72 measured in chloroform at 25° C. at a concentration of 0.2 gram per 100 milliliters of chloroform were employed. These samples were treated by dipping in acetone and acetone-water solutions at concentrations and for various times and thereafter annealed at different temperatures and different times as indicated in the table below. Each of the samples tested were evaluated for appearance and print resistance to solvating organic liquids and crazing.

The ability of these samples to resist indelible marking or marring by body oils is measured in the following manner: Samples of sebaceous oils secreted by humans (especially from the facial area) are transferred to a suitable probe and pressed by hand into the surface of the polymer and oil is deposited from the probe into the impression and is allowed to remain there overnight (generally about 17 hours) at room temperature (about 25° C.). Removal of the mar and/or oil is then attempted using an absorbent, nonabrasive type of rubbing pad, such as cheese cloth, and hand pressure.

The particular concentrations, time and results are set forth in the table below.

3. The method of claim 1 wherein the polymer is annealed by heating the polymer in boiling water.

4. A method of preparing a shaped transparent, non-oriented carbonate polymer containing the esterification residue of 2,2,4,4-tetramethylcyclobutanediol-1,3 having a crystalline surface and an amorphous interior and which is resistant to attack by solvating organic liquids, such as conventional solvents for the polymer, and body oils, without adversely affecting their transparency, comprising immersing the amorphous polymer in liquid aqueous solution of acetone containing from about 50 percent to about 90 percent by volume of acetone based on the volume of the combined mixture for a period of from about 2 to about 60 seconds and thereafter annealing the polymer by heating to a temperature below its glass transition temperature for a period of time sufficient to remove stresses.

5. The method of claim 4 wherein the aqueous acetone

| Sample | Percent acetone | Immersion time, seconds | Annealing conditions | | | Appearance | Print resistance |
|---|---|---|---|---|---|---|---|
| | | | Environment | Time | Temp., °C. | | |
| 1 | 90 | 20 | Air | 15 minutes | 100 | Unchanged | Good |
| 2 | 90 | 5 | Air | 5 minutes | 100 | ...do... | Do. |
| 3 | 85 | 2 | Air | 10 minutes | 110 | ...do... | Do. |
| 4 | 80 | 2 | Air | 1 minute | 130 | ...do... | Do. |
| 5 | 75 | 5 | Air | 15 minutes | 110 | ...do... | Do. |
| 6 | 70 | 30 | Air | 60 minutes | 110 | ...do... | Do. |
| 7 | 60 | 60 | Air | 15 minutes | 100 | ...do... | Do. |
| 8 | 50 | 60 | Air | 15 minutes | 110 | ...do... | Do. |
| 9 | 80 | 5 | Air | 2 minutes | 130 | ...do... | Do. |
| 10 | 80 | 60 | Air | 15 minutes | 100 | ...do... | Do. |
| 11 | 80 | 120 | Air | 10 minutes | 110 | ...do... | Do. |
| 12 | 80 | 5 | Flame | 2-3 seconds | | ...do... | Do. |
| 13 | 80 | 5 | Water | 2 minutes | 100 | ...do... | Do. |
| 14 | 80 | 5 | Ethylene glycol | ½ minute | 130 | ...do... | Do. |
| 15 | 80 | 5 | Not annealed | | | ...do... | Crazes. |

It is not intended herein to imply that when any portion of the polymer is amorphous that it is totally free of crystallinity. It is possible that some crystallinity is present in the amorphous phase but it is undetectible by conventional crystallinity detection methods and/or not significant enough to render that portion resistant to subsequent attack by organic solvents and body oils.

What is claimed is:

1. Method of preparing a shaped transparent, non-oriented carbonate polymer containing the esterification residue of 2,2,4,4-tetramethylcyclobutanediol-1,3 having a crystalline surface and an amorphous interior and which is resistant to attack by solvating organic liquids, such as conventional solvents for the polymer and fatty acids and the like usually found in body oils, without adversely affecting their transparency which method comprises immersing the amorphous shaped polymer in a liquid aqueous solution of acetone, the solution being maintained at such a concentration and the immersion period being for such a time sufficient to crystallize the surfaces of the polymer in contact therewith without adversely affecting the transparency of the polymer, and thereafter annealing the polymer by heating to a temperature below its glass transition temperature for a period of time sufficient to remove stresses.

2. The method of claim 1 wherein the immersion time of the polymer in the solution is from about 3 to about 5 seconds.

solution contains at least about 80 percent by volume acetone based on the total volume of the solution.

6. The method of claim 4 wherein the immersion time of the polymer in the solution is from about 3 to about 5 seconds.

7. The method of claim 4 wherein the polymer is annealed by heating the polymer in boiling water.

References Cited

UNITED STATES PATENTS

| | | | |
|---|---|---|---|
| 3,155,756 | 11/1964 | Hechelhammer et al. | 264—178 |
| 3,214,500 | 10/1965 | Maerov et al. | 8—130.1 |
| 3,244,789 | 4/1966 | Hofmeir | 264—343 X |
| 3,313,777 | 4/1967 | Elam et al. | 260—77.5 DX |
| 3,327,033 | 6/1967 | Koch et al. | 264—341 X |
| 3,375,210 | 3/1968 | D'Onofrio | 260—77.5 DX |
| 2,336,384 | 12/1943 | Baker et al. | 264—346 |
| 3,252,844 | 5/1966 | Hechelhammer et al. | 117—138.8 |
| 3,446,886 | 5/1969 | Karrekhoff | 264—234 |

FOREIGN PATENTS 693,056   8/1964   Canada _____ 264—290

DONALD J. ARNOLD, Primary Examiner

J. H. WOO, Assistant Examiner

U.S. Cl. X.R.

264—235, 346; 8—130.1